Aug. 28, 1945.　　　G. T. RANDOL　　　2,383,616
CONTROL MECHANISM FOR CHANGE SPEED GEARING
Filed Jan. 27, 1944　　　3 Sheets-Sheet 1
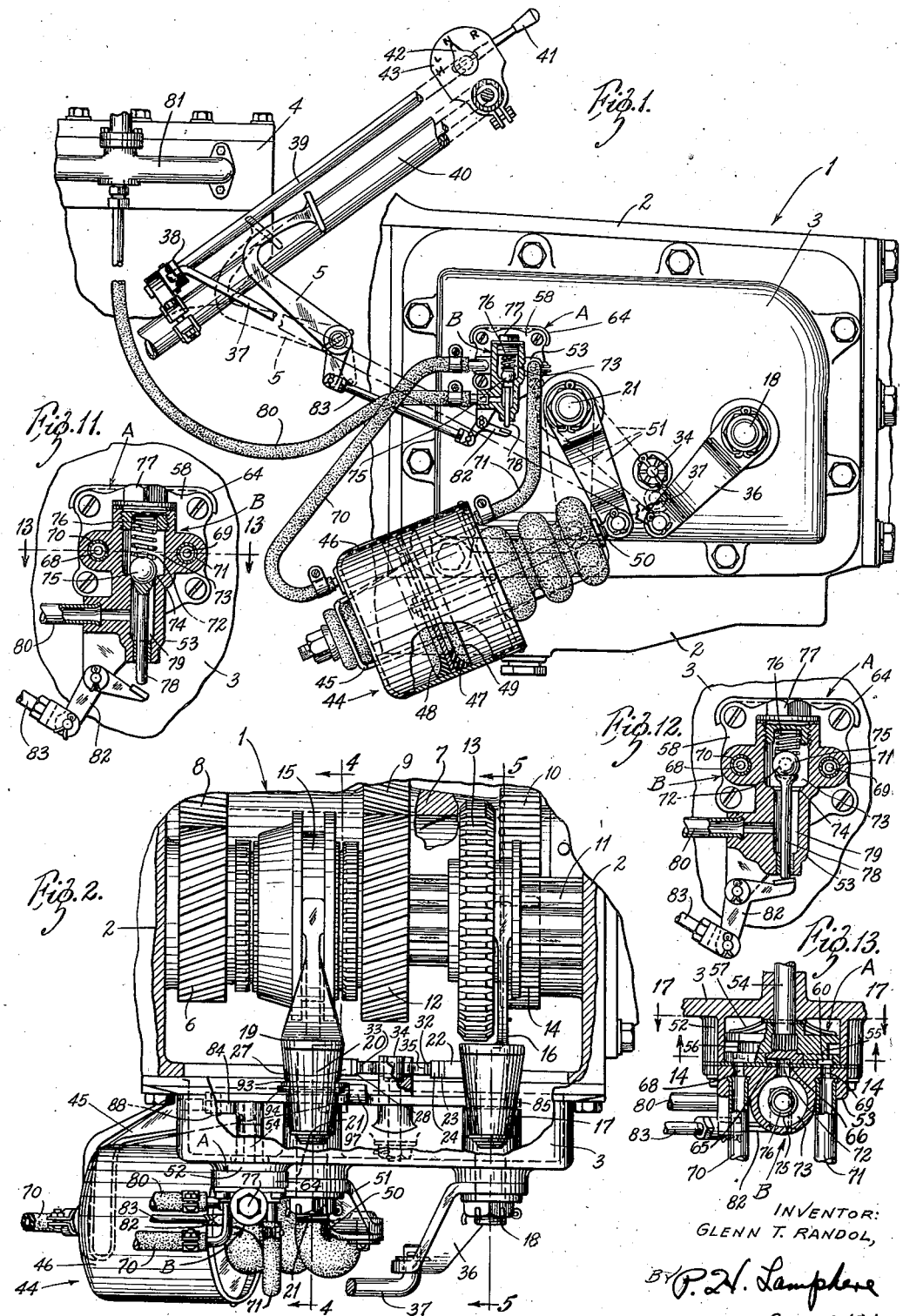
INVENTOR:
GLENN T. RANDOL,
BY P. H. Lamphere
ATTORNEY.

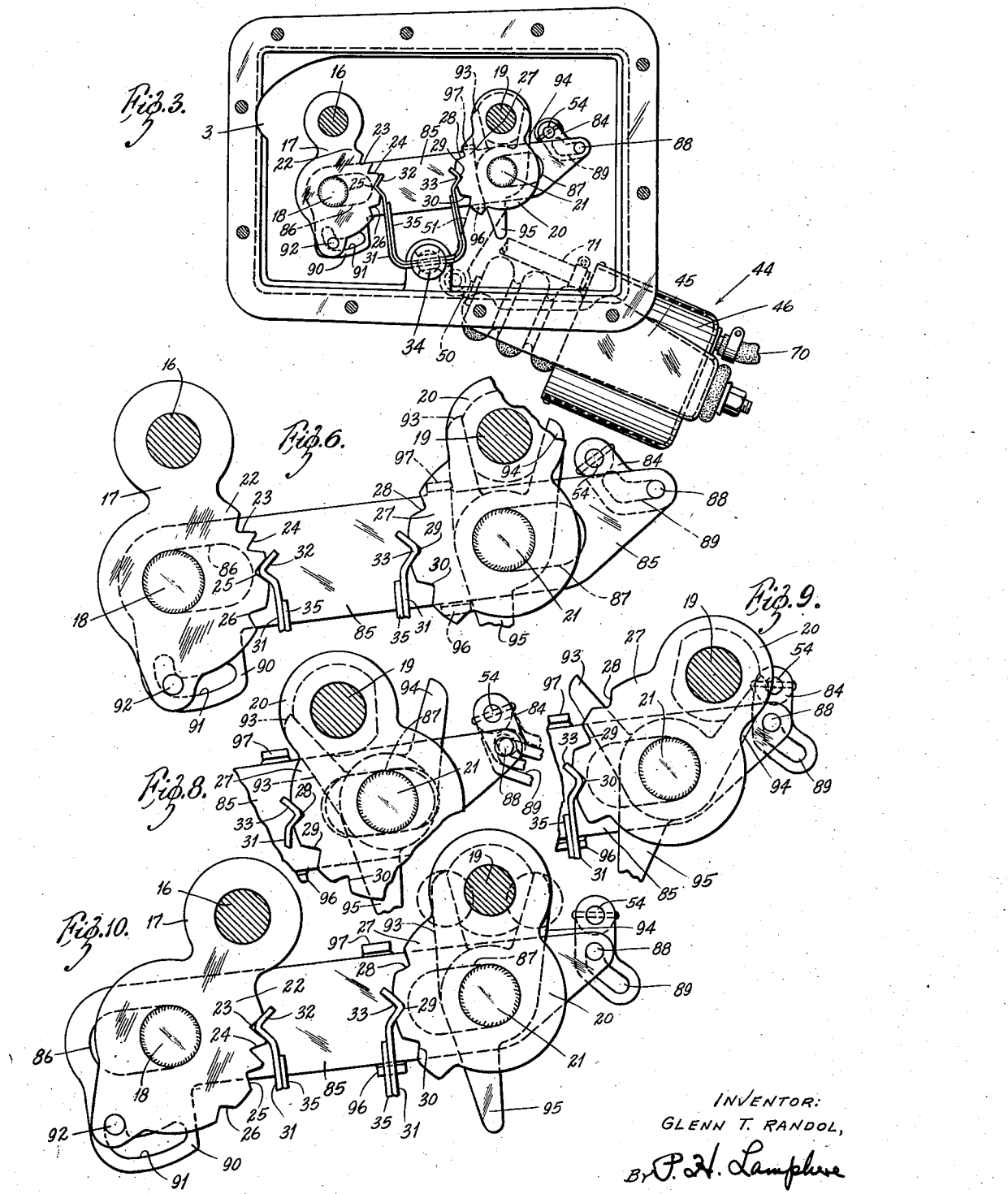

Aug. 28, 1945.  G. T. RANDOL  2,383,616
CONTROL MECHANISM FOR CHANGE SPEED GEARING
Filed Jan. 27, 1944  3 Sheets-Sheet 3
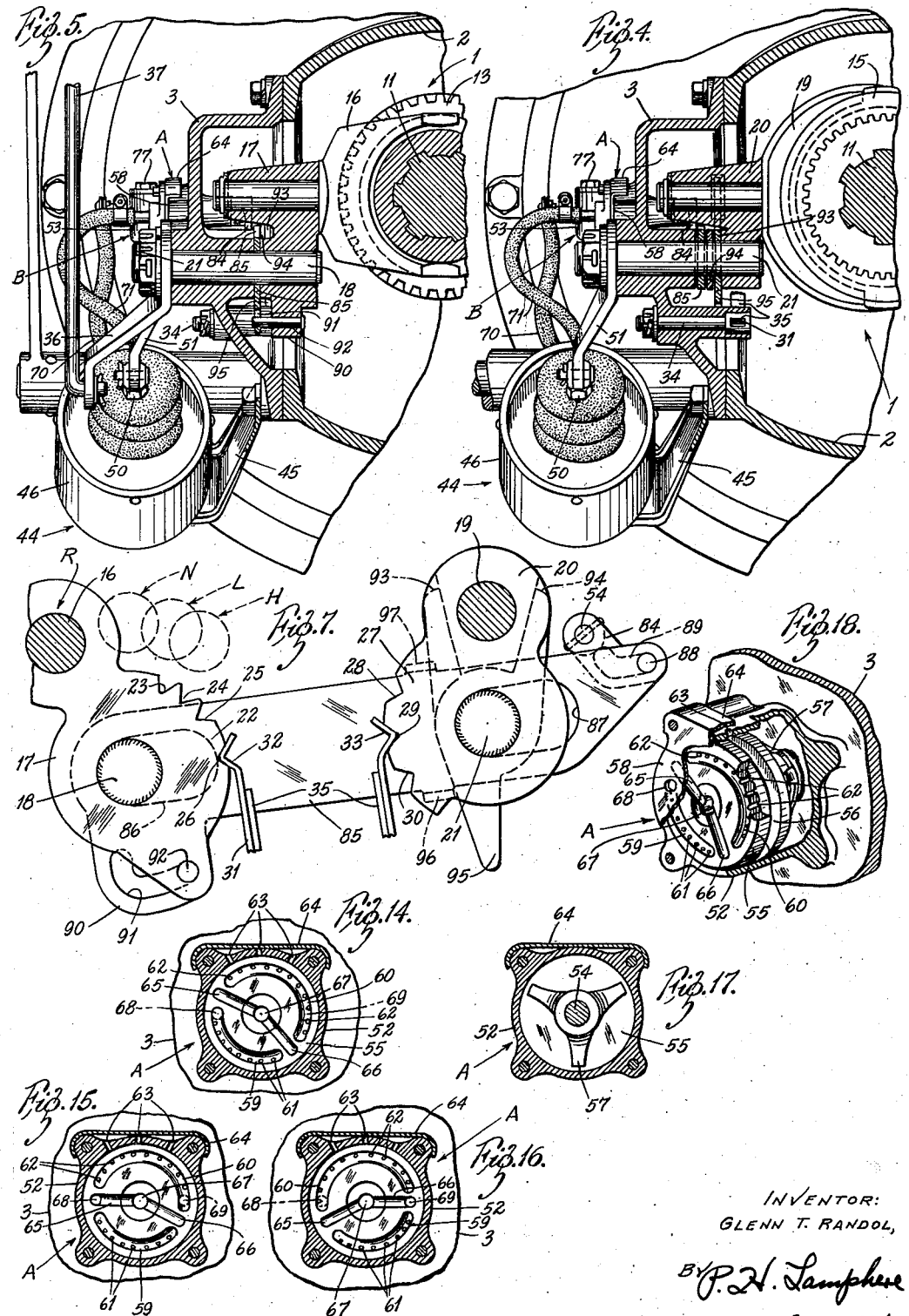
INVENTOR:
GLENN T. RANDOL,
BY P. H. Lamphere
ATTORNEY.

Patented Aug. 28, 1945

2,383,616

UNITED STATES PATENT OFFICE 2,383,616

CONTROL MECHANISM FOR CHANGE-SPEED GEARING

Glenn T. Randol, St. Louis, Mo.

Application January 27, 1944, Serial No. 519,852

20 Claims. (Cl. 192—3.5)

My invention relates to control mechanism for a motor vehicle change speed gearing and more particularly to an improved manual selecting and neutralizing means and power-operated gear ratio establishing means therefor.

One of the objects of my invention is to provide an improved control means for a change speed gearing which will permit preselection of either of two gear ratios by movement of a hand-operated member from a neutral position to either of two other positions and the subsequent establishment of the gear ratios by a power-operated means controlled at will by another operator-operated member.

Another object of my invention is to associate with a control means of the type referred to, means for neutralizing an established gear ratio at will and by manual effort only, when the hand-operated member is moved back to its neutral position.

Still another object of my invention is to embody in the type of control means referred to, a power cylinder and a control valve as the means for establishing either gear ratio and to operate the control valve by a movement of the main clutch control pedal beyond its clutch disengaging point.

Yet another object of my invention is to associate with a change speed gearing improved control means comprising a power cylinder for establishing either of two gear ratios and valve means controlled by an operator-operated member for selecting which gear ratio will be established by operation of the power cylinder together with means for manually neutralizing either established gear ratio by a movement of the operator-operated member.

A still further object of my invention is to provide an improved control means for a change speed gearing having three gear ratios which will permit the operator, by moving a single member, to manually establish and neutralize one gear ratio, to manually select either of the other gear ratios, and to manually neutralize either of said other gear ratios when operative and which will permit the establishment of either of said other gear ratios when selected by the controlling of a power-operated member.

Another object is to so embody the single operator moved member in the control means above referred to that all of the operations effected thereby are accomplished by a movement in a single plane.

Other objects will become apparent from the following description taken in connection with the accompanying drawings in which Figure 1 is a side view of a change speed gearing having a control means therefor embodying my invention, the parts being shown in positions corresponding to neutral condition of the gearing;

Figure 2 is a top view of the gearing and part of the control mechanism;

Figure 3 is a view showing the structure mounted on the inside of the cover plate of the gearing casing and its relation to the shifting power cylinder;

Figures 4 and 5 are sectional views taken on the lines 4—4 and 5—5, respectively, of Figure 2;

Figure 6 is an enlarged view of part of the structure shown in Figure 3;

Figure 7 is a view similar to that of Figure 6 but showing the parts in the positions assumed when the gearing is in reverse gear ratio;

Figure 8 is a view of the parts on the inside of the cover plate which are associated with the two forward speed ratios, said view showing the parts in the positions assumed when the low gear ratio is established;

Figure 9 is a view similar to Figure 8 but showing the parts in the positions assumed when the high gear ratio is established;

Figure 10 is a view similar to Figures 6 and 7 but showing the parts in the positions assumed when the high gear ratio is selected from a neutral condition but prior to the high gear ratio being established;

Figure 11 is a sectional view of the clutch pedal controlled valve for the power cylinder, said valve being shown in closed position;

Figure 12 is a view similar to Figure 11 but with the valve in open position;

Figure 13 is a sectional view of the selector valve for the power cylinder, said view being taken on the line 13—13 of Figure 11;

Figure 14 is a sectional view taken on the line 14—14 of Figure 13, the valve parts being shown in the positions assumed when the hand control lever is in its neutral position;

Figures 15 and 16 are views similar to Figure 14 but showing the valve parts in the positions assumed when the hand lever is set in the low and high gear ratio selecting positions, respectively;

Figure 17 is a sectional view taken on the line 17—17 of Figure 13 and showing the rear of the selector valve; and Figure 18 is a perspective view of the selector valve with parts of the casing broken away, said view showing the valve parts in neutral position.

Referring to the drawings in detail and first to Figures 1 to 5, there is disclosed a change speed gearing generally indicated by the numeral 1 with which my improved control mechanism is associated, this transmission being enclosed in a housing 2 provided with a cover plate 3 and situated between the usual engine 4 of the vehicle and the usual propeller shaft (not shown). Between the engine and the change speed gearing is the usual main friction clutch mechanism (not shown) which is employed to disconnect the transmission of the power from the engine to the gearing for any desired purpose including the facilitating of gear ratio changing. This main clutch is controlled by the clutch pedal 5.

The particular change speed gearing employed is one having two forward speed ratios and a reverse gear ratio. The gearing arrangement is shown in Figure 2 and comprises a combined driving shaft and gear 6 which is connected through the main clutch so as to be driven by the crankshaft of the engine. The gear 6 constantly drives a countershaft 7 which carries gears 8, 9, and 10, gear 8 being in constant mesh with gear 6. Axially aligned with the combined driving shaft and gear 6 is a driven shaft 11 having rotatably mounted thereon a gear 12 constantly meshing with gear 9 of the countershaft to thereby provide the low gear ratio. The driven shaft 11 has splined thereon a reverse gear 13 which is adapted to be engaged with and disengaged from an idler gear 14 constantly meshing with the gear 10 on the countershaft to thus provide the reverse gear ratio. Also splined on the driven shaft is a double clutch element 15 which is positioned between gears 6 and 12 and is employed to selectively connect either gear 12 to the driven shaft or the driven shaft directly to the combined driving shaft and gear 6 so as to provide a direct drive. In connection with the gearing arrangement, it is to be noted that the splined portion of the driven shaft 11 is of such length that reverse gear 13 is free to have movement toward gear 12 after it is initially disengaged from the idler gear.

As best shown in Figures 2, 3, 4, and 5, the sliding gear 13 is actuated by a shifting fork 16 which is pivotally mounted in an arm 17 secured to a short shaft 18 journaled in the cover plate 3. The double clutch element 15 is also actuated by a shifting fork 19 which is pivotally mounted in an arm 20 secured to a short shaft 21 also journaled in the cover plate at a point forward of shaft 18. Thus it is seen that by rotating shafts 18 and 21, the movable elements of the change speed gearing can be actuated to obtain all the gear ratios.

The arm 17 in which the shifting fork 16 is pivoted is provided with a flange portion 22 having four notches 23, 24, 25, and 26. In a similar manner the arm 20, which pivotally carries the shifting fork 19, is provided with a flange 27 in which are three notches 28, 29, and 30. Arranged for cooperation with the notches is a U-shaped leaf spring element 31 which has the ends of its legs 32 and 33 formed to provide detent elements whereby the arms can be yieldably held in the various positions to which they can be moved. The U-shaped leaf spring element 31 has its base portion mounted on the cover plate by a suitable bolt construction 34. A second U-shaped leaf spring 35 is also provided to strengthen the spring element 31.

As best seen in Figures 1, 2, 4, and 5, shaft 18, which is adapted to actuate the shifting fork 16 of the sliding gear 13, has secured to its outer end an arm 36 which is connected by a link 37 to an arm 38 carried by the lower end of a rod 39 rotatably mounted on the steering column 40 of the motor vehicle in parallel relation thereto. The upper end of rod 39 which is just below the steering wheel (not shown) on the upper end of the steering column has connected thereto a hand lever 41 whereby the rod may be rotated to bring about the shifting of gear 13. The upper end of rod 39 carries a pointer 42 which cooperates with indicia on a plate 43 secured to the upper end of the steering column, said plate also forming a bearing support for the upper end of the rod 39. In Figure 1 the plate and hand lever are shown as being viewed from the top or driver's position. The particular indicia on the plate is shown as "R," "N," "L," and "H" which corresponds to reverse, neutral, low, and high gear ratio conditions of the change speed gearing. When the hand lever 41 is positioned so that the pointer 42 indicates "N," as shown in Figure 1, the sliding gear 13 will be in the position shown in Figure 2 wherein it is just disengaged from the reverse idler gear 14. If the hand lever should be moved so that the pointer indicates "R," gear 13 will be moved to mesh with the idler gear 14 to establish reverse speed ratio. If the hand lever should be moved so that the pointer indicates either "L" or "H," gear 13 will be moved to the left of the position shown in Figure 2 which will be permitted by the gear arrangement. From this structure it is seen that the reverse gear ratio is manually controlled at all times and the reverse gear ratio can be established and neutralized by merely rotating the hand lever to the position "R" and then back to the position "N." Neutral condition of the reverse ratio will also be maintained when the hand lever is moved to the "L" and "H" positions. Thus it is seen that arm 17 for actuating gear 13 has four positions which are indicated in Figure 7 by the letters "R," "N," "L" and "H," the latter three being shown by dashed circles.

The double clutch element 15 which controls the two forward gear ratios of the change speed gearing is arranged to be shifted by power to thus relieve the operator of heavy manual effort. The power means employed is a power cylinder in the form of a suction motor 44 shown in Figures 1, 2, 3, 4, and 5. This power cylinder is secured to the gearing casing by a bracket 45 and comprises essentially a cylinder 46 closed at both ends and a piston 47 having packing elements 48 and 49 on opposite sides thereof. The piston is provided with a piston rod 50 which extends out of the rear end wall of the cylinder for connection with arm 51 which is secured to the outer end of shaft 21 controlling the gear shifting fork 19 for the double clutch element 15. When the double clutch element is in its central or neutral position, as shown in Figure 2, the piston 47 in the power cylinder will be at the center of cylinder 46. When the piston is moved toward the forward end of the cylinder, as viewed in Figure 1, the double clutch element will be moved rearwardly, as viewed in Figure 2, and thereby cause gear 12 to be connected to the driven shaft and the low speed ratio of the gearing established. When the piston is moved toward the rear end of the cylinder, the double clutch element will be moved forwardly and the high speed or direct drive of the gearing will be established.

Referring now to Figures 1 and 11 to 18, the two valves employed for controlling the power cylinder will be described, said valves comprising a selector valve "A" and a control valve "B." Both of these valves are mounted together on the exterior of the gearing cover plate. The cover plate is formed with an integral cylindrical extension 52 which encloses the selector valve "A" and the extension is provided with a cover member 53 in which is housed the control valve "B." Journaled in the cover plate is a shaft 54 which extends into the extension 52 and secured thereon is a piston valve element 55 having an annular groove 56 in its peripheral surface. A three pronged leaf spring 57 acts to bias the forward face of this piston valve element into engagement with a partition plate 58 clamped between the cover member 53 and the extension 52. In the forward face of the piston are two arcuate grooves 59 and 60 which are connected by a plurality of small holes 61 and 62 with the annular groove 56. The annular groove communicates with the atmosphere by way of holes 63 in the extension 52, which holes are beneath a protecting flange 64 of the partition plate 58. The face of the piston is also provided with two radially positioned grooves 65 and 66 which communicate with a central bore 67. Both radial grooves extend to points adjacent the periphery of the piston which lie between the adjacent ends of the two arcuate grooves 59 and 60 as clearly shown in Figures 14, 15, 16, and 18. Passages 68 and 69 are provided in the cover member 53 and partition 58 for cooperation with the grooves in the face of the piston valve element. The passage 68 communicates with a conduit 70 which leads to the forward end of cylinder 46 of the power cylinder and the passage 69 communicates with a conduit 71 which leads to the rear end of cylinder 46.

The central bore 65 continuously communicates with a passage 72 leading to a chamber 73 in cover member 53. Within this chamber 73 is housed the control valve "B" which comprises a valve seat 74 and a ball valve element 75 within the chamber. The ball element is normally biased to seated position by a spring 76 interposed between the ball and a closure plug 77 for chamber 73. The ball is adapted to be unseated by a stem 78 which extends from the exterior through a bore 79 below the valve seat. The bore 79 is connected by a conduit 80 to the manifold 81 of the motor vehicle engine 4 (Figure 1). The stem 78 is adapted to be actuated by a bellcrank lever 82 pivotally mounted on the lower part of the cover member 53, said bellcrank lever being connected by a link 83 with the clutch pedal 5 for the main clutch. The connecting link and bellcrank lever are so arranged that when the clutch pedal is in a clutch-engaged position, the ball valve element will be seated under the action of spring 76. This condition is shown in Figure 11. Under these conditions the arm of the bellcrank lever will be spaced slightly from the valve stem so that there will be some lost motion before the valve stem can be engaged by the bellcrank lever. This lost motion is sufficient to permit the disengagement of the clutch by pedal 5 before the valve stem is actuated to unseat the ball valve element 75. As soon as the clutch pedal reaches a point where the clutch is just disengaged, the bellcrank lever will pick up the valve stem and unseat the ball valve element, thereby opening valve "A" and placing chamber 73 in communication with the manifold. To fully unseat the ball, only a slight movement of the pedal beyond the clutch disengaging point is required.

As already mentioned, the piston valve element 55 of the selector valve is secured to a shaft 54 which is journaled in the gearing cover 3. The inner end of this shaft carries an actuating arm 84 whereby the valve can be controlled by a mechanism mounted on the inside of the gearing cover plate 3, which mechanism is best shown in Figures 3, 6, 7, 8, 9, and 10. Referring now to these figures, there is provided a flat bar 85 which is carried on shafts 18 and 21 employed to actuate the two shifting forks. This bar has slots 86 and 87, the former receiving shaft 18 and the latter shaft 21. The bar is positioned between arms 17 and 20 carried by the shafts and the cover plate, this relationship being best shown in Figures 4 and 5. The forward end of the bar carries a pin 88 which is adapted to cooperate with an L-shaped slot 89 in the arm 84. The rear end of the bar has a downwardly extending projection 90 in which is an L-shaped slot 91 for receiving a pin 92 carried by an extension of arm 17 which is secured to the inner end of shaft 18. This latter pin and slot connection are so arranged that the bar will not in any way be actuated by the rotation of arm 17 whenever the arm is moved to a position to cause reverse gear ratio to be established or in the normal neutral position, as shown in Figure 2, and corresponding to the hand lever being set in the "N" position. See also the "N" position of arm 17 in Figure 7. However, if arm 17 should be rotated by the hand lever 41 to the "L" and "H" positions, the bar will be pulled to the left from the positions shown in Figures 6 and 7, thereby causing arm 84 to be rotated by pin 88 and thus rotate the piston valve element of the selector valve "A." For "L" position the piston valve element will assume the position shown in Figure 15 and for the "H" position, it will assume the position shown in Figure 16.

In addition to having bar 85 mounted thereon, shaft 21 also has pivotally mounted thereon two levers 93 and 94 which are arranged to extend on opposite sides of the upper portion of arm 20 in which the shifting fork 19 is pivoted. The lever 94 has a projecting portion 95 which extends below shaft 21 and is arranged to cooperate with a lug 96 carried by the lower edge of bar 85. The upper edge of the bar has a similar lug 97 which is adapted to cooperate with lever 93. The arrangement of the levers and their cooperation with the lugs on the bar are such that the bar can be employed to move the shifting fork 19 to its central position at any time so as to centralize the double clutch element 15 (if either forward gear ratio is established) and thereby neutralize said gear ratios. It is to be noted that the lugs so cooperate with the levers that the levers will be moved toward each other whenever the bar is moved from its position corresponding to the "L" and "H" hand lever setting (Figures 8 and 9) to its position corresponding to "N" (Figure 6).

Referring to the operation of my improved control mechanism, when the gearing is in neutral condition all the parts will assume positions as indicated in Figures 1 to 6, 11, 14 and 18. The hand lever 41 will be positioned so that the pointer is at "N." If the main clutch is engaged, the control valve "B" will be closed as shown in Figures 1 and 11. The selector valve "A" will be conditioned so that the two arcuate grooves 59 and 60 will communicate with conduits 70 and 71, respectively, so as to connect both ends of the power cylinder to atmosphere by way of the annular groove 56 in the piston valve element. The arms 17 and 20 and bar 85 will be in the positions shown in Figure 6. Thus under these conditions, even if the clutch pedal should be moved beyond the clutch disengaged position, the power cylinder cannot operate because regardless of the unseating of the ball valve element 75, there will be no communication between chamber 73 and either end of the power cylinder.

If it should now be desired to obtain reverse speed ratio, all that is necessary is to disengage the main clutch by actuation of the clutch pedal 5 and rotate lever 41 to the position where the pointer is at "R." This will move gear 13 from the position shown in Figure 2 to a position where it engages the idler gear 14. To disengage the reverse speed ratio, the clutch pedal need only be moved to clutch disengaged position and the handle returned to the "N" position. This will move gear 13 back to the position shown in Figure 2. The selector valve "A" will not be operated in any way by the establishment of the reverse gear ratio as will be noted by reference to Figure 7 wherein arm 17 is shown in the reverse gear ratio position without causing any movement of bar 85.

If it should now be desired to establish the low speed ratio of the transmission, the hand lever 41 is moved so that the pointer indicates "L." This movement of the hand lever will cause a forward sliding movement of gear 13, as viewed in Figure 2, thereby positioning it farther away from the reverse idler gear 14. The arm 17 will be rotated to the indicated "L" position in Figure 7. This causes pin 92 to be moved in slot 91 to a point beyond the bend thereof and causing a movement of bar 85 rearwardly from the positions shown in Figures 6 and 7 to such a position that the pin 88 in the forward end of the bar will engage the angular portion of slot 89 and cause a rotation of arm 84 to the position shown in Figure 8. This will cause the piston valve element to assume the position shown in Figure 15 where radial groove 65 will communicate with conduit 70 leading to the forward end of the power cylinder. The rear end of the power cylinder will remain in communication with the atmosphere since conduit 71 will continue to communicate with the arcuate groove 60. If the clutch pedal is moved slightly beyond clutch disengaged position, the main clutch will be disengaged and the ball valve element 75 unseated. The forward end of the power cylinder will now be placed in communication with the manifold of the engine and the vacuum created thereby will result in the piston of the power cylinder being moved forwardly. This will move arm 20 to the position shown in Figure 8 and shift the double clutch element 15 rearwardly and cause gear 12 to be connected to the driven shaft. The lever 93 will be rotated on shaft 21 when arm 20 is rotated. When the main clutch is re-engaged, the vehicle can be driven forwardly in low speed gear ratio.

If it should be desired to obtain high speed ratio, all that need be done is to set the hand lever so that the pointer indicates "H" and then disengage the main clutch by the clutch pedal and move it slightly beyond clutch disengaged position. The movement of the hand lever to the "H" position will result in arm 17 carrying the shifting fork 16 to be rotated to the "H" indicated position in Figure 7 and the full line position in Figure 10. This causes pin 92 to move the bar to the position shown in Figure 10. The movement of the bar causes additional rotation of the piston valve element of the selector valve "A" by means of pin 88 at the forward end of the bar acting on lever 84. The "H" position of lever 84 is shown in Figures 9 and 10. The piston valve element will now be positioned as shown in Figure 16 and under such conditions conduit 71 leading from the rear end of the power cylinder will be placed in communication with chamber 73 by way of the radial groove 66 in the face of the piston valve element and the forward end of the power cylinder will be placed in communication with atmosphere since the arcuate groove 60 is now positioned to be in communication with passage 68 with which the conduit 70 communicates. When the clutch pedal is depressed to the point just beyond clutch-disengaged position, the ball valve element 75 will be unseated and the rear end of the fluid motor connected to the manifold, thus resulting in the piston being moved to the rear end of the power cylinder and the double clutch element 15 moved forwardly to directly connect the drive and driven shafts for the high speed ratio. When high speed ratio is established the rotation of arm 20 will move lever 94 about shaft 21 to the position shown in Figure 9.

If it should be desired to obtain high speed ratio directly from neutral, all that need be done is to set the hand lever in the "H" position from the "N" position. This will place the arm 17 and the bar in the positions shown in Figure 10 and set the selector valve "A" in the position shown in Figure 16. The companion levers 93 and 94 will not be moved from their closed positions. When the control valve "B" is now opened the power cylinder will rotate shaft 21 clockwise, as seen in Figure 10, and cause the double clutch element 15 to connect for direct or high speed ratio drive. The rotation of the shifter fork arm 20 will rotate the lever 94 outwardly with it.

If it should be desired to neutralize the transmission whenever the low or high speed ratios are established, all that is required is to disengage the main clutch pedal and move the hand lever back to "N" position. Movement of the hand lever back to "N" position results in rotation of shaft 18 and arm 17 and movement of bar 85 to the position shown in Figure 6. As the bar is moved to the right by the pin 92 it will cause rotation of arm 84 and a like rotation of the piston valve element to the position shown in Figure 14 where both ends of the power cylinder will be in communication with the atmosphere. When the piston valve element reaches this position, the pin 88 in the forward end of the bar will no longer move the valve element as the slot in the arm will permit additional movement of the bar. When this additional movement of the bar begins, lugs 96 and 97 on the bar will engage and pick up the levers 93 and 94 (if both levers are spread apart) and move them toward each other and thus bring the arm 20 which carries the shifting fork 19 back to its central position and thereby cause a neutralization of the transmission by manual effort. Both levers 93 and 94 will be in spread-apart position as shown in Figure 9 if both the low and high gear ratios have been established prior to neutralization. If low only has been established, lever 93 will be the only one picked up for moving arm 20 back to its central position from the position shown in Figure 8. If high only has been established, then lever 94 will be the only one to be picked up to move arm 20 back to neutral position from the position shown in Figure 9. Bringing the shifting fork 19 and the double clutch element 15 to central position by manual effort will also result in the piston of the power cylinder being returned to its central position which will not be resisted by any differential air pressure since both ends of the power cylinder will have been connected to atmosphere through the selecting valve prior to the lugs 96 and 97 engaging either or both levers 93 and 94 to move them toward each other to bring about the neutralization. The position which arm 84 assumes to condition the selector valve so that both ends of the power cylinder are connected to atmosphere is shown in dashed lines in Figure 8.

It is to be noted that the control mechanism is very simple in construction throughout. The selector valve "A" and control valve "B" are associated with each other in compact form. The piston valve element of the selector valve is arranged to have its face held seated against the partition plate by differential fluid pressure in addition to the three-pronged leaf spring 57, thus providing efficient sealing. The ball valve element of the control valve "B" permits this valve to be opened by a small movement of the clutch pedal. It is also to be noted that when the gearing is in reverse gear ratio, the double clutch element will be held in its central position by the lugs on bar 85 and the levers 93 and 94, thus providing means for preventing any possibility of simultaneous establishment of two speed ratios. When either forward gear ratio is established, it cannot be maintained if the reverse gear ratio is established. Although the gearing and control mechanism is shown as used in connection with a main friction clutch, it can also be used with a fluid drive arrangement wherein a fluid coupling replaces the clutch. Under such conditions the control valve "B" could be operated by a manually-operated button or the like.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a control mechanism for a change speed gearing having a shiftable element for establishing two speed ratios, a power-operated member connected to move the shiftable element to its operative positions, a selecting means for determining which speed ratio the operation of the power means will establish, an operator-operated member having a neutral position and two other positions, means operable by the movement of the operator-operated member from neutral position to one of the two other positions for manually placing the selecting means in one speed ratio selecting condition and to the other of the two positions for manually placing the selecting means in the other speed ratio selecting condition, said operator-operated member and selecting means obtaining full selection without movement of the power means and maintaining each selecting condition as long as the operator-operated member is undisturbed from the full selecting position control means operable independently of the operator-operated member for causing the power-operated means to operate and establish the speed ratio selected by the selecting means when the selecting means is in full selecting position, and means operable by the operator-operated member for neutralizing by manual effort an established speed ratio when said member is returned to neutral position.

2. In a control mechanism for a change speed gearing having a shiftable element for establishing two speed ratios, a power-operated member connected to move the shiftable element to its operative positions, a selecting means for determining which speed ratio the operation of the power means will establish, an operator-operated member having a neutral position and two other positions, means operable by the movement of the operator-operated member from neutral position to another position for manually placing the selecting means in one individual speed ratio selecting condition and to the third position for manually placing the selecting means in the other individual speed ratio selecting condition, said operator-operated member and selecting means obtaining full selection without movement of the power means and maintaining each selecting condition as long as the operator-operated member is undisturbed from the full selecting position control means operable independently of the operator-operated member for causing the power-operated means to operate and establish the speed ratio selected by the selecting means, and means operable by the operator-operated member for disabling the power means and for neutralizing by manual effort an established speed ratio when said member is returned to neutral position.

3. In a control mechanism for a change speed gearing having a shiftable element for establishing two speed ratios, a power cylinder having a movable element connected to move the shiftable element to its operative positions, a source of fluid pressure different from atmosphere, a selecting valve for the power cylinder having two operative positions, an operator-operated member connected to the selecting valve and having two positions corresponding to the full selective operative positions of the valve and capable of placing the valve in the full selective positions without operation of the power cylinder, a second valve for controlling the connection of the source with the power cylinder through the selecting valve, means for operating the second valve independently of the operator-operated member, and means operable by the operator-operated member for neutralizing by manual effort an established speed ratio when said member is moved from a selecting valve operative position.

4. In a control mechanism for a change speed gearing having a shiftable element for establishing two speed ratios, a power cylinder having a movable element connected to move the shiftable element to its operative positions, a source of fluid pressure different from atmosphere, a selecting valve for the power cylinder having two operative positions, an operator-operated member connected to the selecting valve and having two positions corresponding to the full selective operative positions of the valve and capable of placing the valve in the full selective positions without operation of the power cylinder, a second valve for controlling the connection of the source with the power cylinder through the selecting valve, means for operating the second valve independently of the operator-operated member, and means operable by the operator-operated member for operating the selecting valve to disable the power cylinder and for neutralizing by manual effort an established speed ratio when said member is moved from a selecting valve operative position.

5. In a control mechanism for a change speed gearing having a shiftable element for establishing two speed ratios, a power cylinder having a movable element connected to move the shiftable element to its operative positions by a movement from one end of the cylinder to the other, a source of fluid pressure different from atmosphere, a selecting valve having an inoperative position and two other full selective operative positions for alternately connecting the opposite ends of the cylinder to the source, an operator-operated member connected to the selecting valve and having a neutral position corresponding to the inoperative position of the valve and two other positions corresponding to the full selective operative positions of the valve and capable of placing the valve in the full selective positions without operation of the power cylinder, a second valve for controlling the connection of the source with either selected end of the power cylinder, means for operating the second valve independently of the operator-operated member, and means operable by the operator-operated member for neutralizing by manual effort an established speed ratio when said member is returned from a selecting valve operative position to neutral position.

6. In a control mechanism for a change speed gearing having a shiftable element for establishing two speed ratios, a power cylinder having a movable element connected to move the shiftable element to its operative positions by a movement from one end of the cylinder to the other, a source of fluid pressure different from atmosphere, a selecting valve having an inoperative position and two other full selective operative positions for alternately connecting the opposite ends of the cylinder to the source, an operator-operated member connected to the selecting valve and having a neutral position corresponding to the inoperative position of the valve and two other positions corresponding to the full selective operative positions of the valve and capable of placing the valve in the full selective positions without operation of the power cylinder, a second valve for controlling the connection of the source with either selected end of the power cylinder, means for operating the second valve independently of the operator-operated member, and means operable when the operator-operated member is returnd from an oprative position to the neutral position for first placing the selecting valve in its inoperative position and then neutralizing the gearing by manual effort.

7. In a control mechanism for a change speed gearing having a shiftable element for establishing two speed ratios, a power cylinder having a movable element connected to move the shiftable element to its operative positions by a movement from one end of the cylinder to the other, a source of fluid pressure different from atmosphere, a selecting valve having an inoperative position where both ends of the power cylinder are connected to atmosphere and two other full selective operative positions for alternately connecting the opposite ends of the cylinder to the source, an operator-operated member connected to the selecting valve and having a neutral position corresponding to the inoperative position of the valve and two other positions corresponding to the full selective operative positions of the valve and capable of placing the valve in the full selective positions without operation of the power cylinder, a second valve for controlling the connection of the source with either selected end of the power cylinder, means for operating the second valve independently of the operator-operated member, and means operable when the operator-operated member is returned from an operative position to the neutral position for manually placing the selecting valve in its inoperative position and then manually placing the shiftable element of the gearing in neutral position and the movable element of the power cylinder in a position intermediate the ends of the cylinder.

8. In a control mechanism for a change speed gearing having a shiftable element movable to two positions for establishing two speed ratios, a power-operated member connected to move the shiftable element to its operative positions, selecting means for determining which speed ratio the operation of the power means will establish, an operator-operated member having three positions, means for connecting the operator-operated member to the selecting means and comprising a longitudinally movable member, said selecting means being inoperative in one predetermined position of the operator-operated member and operative to obtain full selection of a speed ratio in the other two positions without movement of the power operated member, control means operable independently of the operator-operated member for causing the power-operated means to operate and establish the speed ratio selected by the selecting means, and means movable by the longitudinally movable member for manually neutralizing an established speed ratio when said operator-operated member is moved from the position where the selecting means is operative to where it is inoperative.

9. In a control mechanism for a change speed gearing having a shiftable element movable to two positions from a central neutral position for establishing two speed ratios, a power-operated member connected to move the shiftable element to its operative positions, selecting means for determining which speed ratio the operation of the power means will establish, an operator-operated member having three positions, means for connecting the operator-operated member to the selecting means, said selecting means being inoperative in one predetermind position of the operator-operated member and operative to obtain full selection of a speed ratio in the other two positions without movement of the power operated member, control means operable independently of the operator-operated member for causing the power-operated means to operate and establish the speed ratio selected by the selecting means, and means comprising companion levers operable by said operator-operated member when it is moved from the position where the selecting means is operative to where it is inoperative to neutralize an established speed ratio.

10. In a control mechanism for a change speed gearing having a shiftable element movable to two positions for establishing two speed ratios, a power cylinder connected to move the shiftable element to its operative position, a source of fluid pressure different from atmosphere, a selecting valve having an inoperative position and two other full selective operative positions for determining which speed ratio the operation of the power cylinder will establish, an operator-operated member having three positions corresponding to the inoperative position of the selecting valve and its two full selective operative positions and capable of placing the valve in the full selective positions without operation of the power cylinder, means for connecting the operator-operated member to the selecting valve and comprising a longitudinally movable member, a control valve for the power cylinder operable independently of the selecting valve, and means movable by the longitudinally movable member for manually neutralizing an established speed ratio when said operator-operated member is moved from an operative position of the selecting valve to the inoperative position thereof.

11. In a control mechanism for a change speed gearing having a shiftable element movable to two positions for establishing two speed ratios, a rotatable shaft connected to the shiftable element, a power cylinder connected to rotate the shaft and move the shiftable element to its operative position, a source of fluid pressure different from atmosphere, a selecting valve having an inoperative position and two other full selective operative positions for determining which speed ratio the operation of the power cylinder will establish, an operator-operated member having three positions corresponding to the inoperative position of the selecting valve and its two full selective operative positions and capable of placing the valve in the full selective positions without operation of the power cylinder, means for connecting the operator-operated member to the selecting valve and comprising a longitudinally movable member, a control valve for the power cylinder operable independently of the selector valve, and means comprising levers pivoted on the shaft and movable by the longitudinally movable member for manually neutralizing the shiftable element when said operator-operated member is moved from an operative position of the selecting valve to the inoperative position thereof.

12. In a control mechanism for a change speed gearing having three speed ratios, an operator-operated member, means operable by said member for establishing and neutralizing one speed ratio at will by manual effort, a power-operated member for establishing either of the other two speed ratios, selecting means for the power-operated member having two full selecting positions to determine which of the two speed ratios will be made operative thereby, means for controlling the selecting means without movement of the power operated member and by a movement of the operator-operated member to two positions other than those required to manually establish and neutralize said one speed ratio, means for causing the power-operated member to operate and establish the gear ratio determined by the selecting means, and means operable by the operator-operated member for neutralizing either of said two gear ratios by manual effort.

13. In a control mechanism for a change speed gearing having three speed ratios, an operator-operated member, means operable by said member for establishing and neutralizing one speed ratio at will by manual effort, a power-operated member for establishing either of the other two speed ratios, selecting means for the power-operated member having two full selecting positions to determine which of the two speed ratios will be made operative thereby, means for controlling the selecting means without movement of the power operated member and by a movement of the operator-operated member to two positions other than those required to manually establish and neutralize said one speed ratio, means for causing the power-operated member to operate and establish the gear ratio determined by the selecting means, and means operable by the operator-operated member for disabling the power means and for neutralizing either of said two gear ratios by manual effort when the operator-operated member is moved from either of the two selecting positions to the neutralizing position of said one speed ratio.

14. In a control mechanism for a change speed gearing having three speed ratios, a member for controlling one speed ratio, an operator-operated member connected to the first named member and movable from one position to another and return for establishing and neutralizing the one speed ratio, a power-operated member for establishing either of the other speed ratios, selecting means having two full selecting positions for determining which of the two speed ratios will be established by operation of the power-operated member, means for operating the selecting means without movement of the power operated member and by a movement of the first named member and the operator-operated member to positions other than those to establish and neutralize the one gear ratio, means for causing the power-operated means to operate, and means for neutralizing either of the two speed ratios by manual effort when the operator-operated member and the first member are returned to the neutralizing position of the one speed ratio.

15. In a control mechanism for a change speed gearing having three speed ratios, an operator-operated member having four selective positions obtainable at will by moving said member in opposite directions in a single path, means operable by said member when placed in one position for manually establishing one speed ratio and when placed in another position for manually neutralizing said one speed ratio, a power-operated member for establishing either of the other two speed ratios, means for selecting which of said other speed ratios will be made operative by the power means, means for moving said selecting means to its two full selective operative positions without movement of the power-operated member by placing the operator-operated member in either of the two remaining positions, means for causing the power-operated member to operate and establish the gear ratio determined by the selecting means, and means operable by the operator-operated member for manually neutralizing either of two said gear ratios by manual effort when the operator-operated member is returned from a selecting position to the neutral position for said one speed ratio.

16. In a control mechanism for a change speed gearing having three speed ratios, an operator-operated member connected to manually establish one of said speed ratios when placed in one position and to neutralize it when placed in another position, a power cylinder connected for establishing either of the other speed ratios, a source of fluid pressure different from atmosphere, a selecting valve for determining which of the speed ratios will be established by operation of the power cylinder, means for operating the selecting valve to full selecting positions by movement of the operator-operated member to either of two positions other than those for establishing and neutralizing said one speed ratio and independently of any movement of the power cylinder, a control valve for causing the power cylinder to operate and establish the selected speed ratio, and means for manually neutralizing when established either of the said other two speed ratios by movement of the operator-operated member to the neutralizing position for the one speed ratio.

17. In a control mechanism for a change speed gearing having three speed ratios, an operator-operated member connected to manually establish one of said speed ratios when placed in one position and to neutralize it when placed in another position, a power cylinder connected for establishing either of the other speed ratios, a source of fluid pressure different from atmosphere, a selecting valve for determining which of the speed ratios will be established by operation of the power cylinder, means for operating the selecting valve to full selecting positions by movement of the operator-operated member to either of two positions other than those for establishing and neutralizing said one speed ratio and independently of any movement of the power cylinder, a control valve for causing the power cylinder to operate and establish the selected speed ratio, and means for manually moving the selecting valve so as to cut off the power cylinder from the source and for subsequently neutralizing when established either of said other two speed ratios by movement of the operator-operated member to the neutralizing position for the one speed ratio.

18. In a control mechanism for a change speed gearing having two shiftable elements controlling three speed ratios and provided with a housing and cover plate, a rotatable member mounted on the cover plate for controlling one of the shiftable members, an operator-operated member for rotating the rotatable member to two positions to establish and neutralize one speed ratio, a second rotatable member mounted on the cover plate for controlling the other shiftable member by a rotation in opposite directions, a power cylinder connected to move the second rotatable member and the other shiftable member to establish either of the other two speed ratios, a source of fluid pressure different from atmosphere, a selecting valve for determining the direction the movable element of the power cylinder will rotate the second rotatable member, means for controlling the full selective setting of the selecting valve independently of any operation of the power cylinder and by movement of the operator-operated member and the first rotatable member to positions other than those required to establish and neutralize the one speed ratio, a control valve for controlling the connecting of the source with the power cylinder through the selecting valve, and means for manually neutralizing either of the two speed ratios by a movement of the operator-operated member to the said neutralizing position of the one speed ratio.

19. In a control mechanism for a change speed gearing having two shiftable elements controlling three speed ratios and provided with a housing and cover plate, a rotatable member mounted on the cover plate for controlling one of the shiftable members, an operator-operated member for rotating the rotatable member to two positions to establish and neutralize one speed ratio, a second rotatable member mounted on the cover plate for controlling the other shiftable member by a rotation in opposite directions, a power cylinder having a movable element connected to move the second rotatable member and the other shiftable member to establish either of the other two speed ratios, a selecting valve for determining the direction the element of the power cylinder will move the second rotatable member, means for controlling the full selective setting of the selecting valve independently of any operation of the power cylinder and by movement of the operator-operated member and the first rotatable member to positions other than those required to establish and neutralize the one speed ratio, a source of fluid pressure different from atmosphere, a control valve for connecting the source with the power cylinder through the selecting valve, and means carried by the cover plate and operable by the operator-operated member and the first rotatable member when returned to the neutralizing position of the one speed ratio for neutralizing either of the other two speed ratios.

20. In a control mechanism for a change speed gearing having two shiftable elements controlling three speed ratios, a rotatable member for controlling one of the shiftable members, an operator-operated member for rotating the rotatable member to two positions to establish and neutralize one speed ratio, a second rotatable member for controlling the other shiftable member by rotation thereof in opposite directions, a power cylinder having a movable element connected to move the second rotatable member and the other shiftable member to establish either of the other two speed ratios, a selecting valve having a shut off position and two open positions for determining the direction the movable element of the power cylinder will move the second rotatable member, means for controlling the full selective setting of the selecting valve independently of any operation of the power cylinder and by movement of the operator-operated member and the first rotatable member to positions other than those required to establish and neutralize the one speed ratio, a source of fluid pressure different from atmosphere, a control valve for connecting the source with the power cylinder through the selecting valve, and means operable by the operator-operated member and the first rotatable member when returned to the neutralizing position for the one speed ratio for first moving the selecting valve to its shut off position and then subsequently neutralizing either of the other two speed ratios.

GLENN T. RANDOL.